(12) United States Patent
Sassi et al.

(10) Patent No.: US 7,375,165 B2
(45) Date of Patent: May 20, 2008

(54) THERMOPLASTIC COMPOSITION COMPRISING A HYPERBRANCHED POLYMER ADDITIVE AND ARTICLES MADE USING SAID MATERIAL

(75) Inventors: Jean-François Sassi, St. Romain En Jarez (FR); Franck Touraud, Vernon (FR); Natalia Scherbakoff, Vourles (FR); Christine Vidil, Communay (FR); Christophe Paulo, Lyons (FR); Sandrine Rochat, Villeurbanne (FR); Jean-Pierre Marchand, Princeton, NJ (US); Bertrand Bordes, Vienne (FR)

(73) Assignee: Rhodianyl, Boulogne Billancourt Cedex (FR)

( * ) Notice: Subject to any disclaimer, the term of this patent is extended or adjusted under 35 U.S.C. 154(b) by 228 days.

(21) Appl. No.: 10/498,422

(22) PCT Filed: Dec. 16, 2002

(86) PCT No.: PCT/FR02/04368

§ 371 (c)(1),
(2), (4) Date: Mar. 31, 2005

(87) PCT Pub. No.: WO03/051993

PCT Pub. Date: Jun. 26, 2003

(65) Prior Publication Data

US 2005/0222376 A1    Oct. 6, 2005

(30) Foreign Application Priority Data

Dec. 17, 2001 (FR) ................................ 01 16321

(51) Int. Cl.
*C08G 69/02* (2006.01)
*C08G 69/08* (2006.01)

(52) U.S. Cl. .............................. 525/420; 424/DIG. 16; 525/425; 525/432

(58) Field of Classification Search ................ 525/432, 525/420, 425; 424/DIG. 16
See application file for complete search history.

(56) References Cited

U.S. PATENT DOCUMENTS 6,225,404 B1 * 5/2001 Sorensen et al. .......... 525/54.1
6,872,800 B1 * 3/2005 Bouquerel et al. .......... 528/310

* cited by examiner

*Primary Examiner*—Ana Woodward
(74) *Attorney, Agent, or Firm*—Buchanan, Ingersoll & Rooney, PC

(57) ABSTRACT

The invention relates to thermoplastic compositions comprising a thermoplastic polyamide matrix and at least one additive which modifies the interaction between the matrix and an agent. The purpose of the invention is to provide an additive which modifies the interaction between a copolyamide-type thermoplastic copolyamide matrix and at least one agent. The aforementioned additive, which comprises at least one hyperbranched functionalised polymer, is not compatible with the matrix. Moreover, said additive can be used for the controlled modification of the interaction between the thermoplastic copolyamide and an internal or external chemical agent. Preferably, the composition does not contain hyperbranched polymers which produce therein a reduction in the molar mass of matrix M which is greater than or equal to 7% in relation to a sample composition which comprises matrix M but does not contain hyperbranched polymer additive(s). Said mass measurement is taken preferably using a determined protocol P. The invention is suitable for use in moulding, injection moulding, injection/blow moulding, extrusion/blow moulding, extrusion or spinning.

23 Claims, 2 Drawing Sheets

THERMOPLASTIC COMPOSITION COMPRISING A HYPERBRANCHED POLYMER ADDITIVE AND ARTICLES MADE USING SAID MATERIAL

This application is an application under 35 U.S.C. Section 371 of International Application Ser. No. PCT/FR02/04368 filed on Dec. 16, 2002.

The field of the invention is that of thermoplastic compositions comprising a thermoplastic polyamide matrix and at least one additive that modifies the interaction of the matrix with an agent.

For the purposes of the present specification, the term "polymer" denotes either a homopolymer or a copolymer.

Thermoplastic polyamides are raw materials that may be converted by moulding, injection-moulding, injection blow-moulding, extrusion, extrusion/blow-moulding or spinning, especially into a wide variety of articles such as expanded, extruded or moulded parts (for example for bodywork), yarns, fibres or films.

In the field of polyamide compositions, it is advantageous to control the affinity of the copolyamide matrix with various chemical or physical agents (e.g. UV), which are external or internal to the matrix, so as to be able to optimize the adaptation of the thermoplastic copolyamide to various applications.

Among the chemical agents that are of interest, in a non-limiting manner, in the context of the invention, mention may be made of water as the external agent, and of internal agents that may be incorporated into the matrix for the purposes of giving it a certain number of properties, for example anti-static agents, adhesives, flame retardants, odoriferous substances, fire retardants, antioxidants, heat-stabilizers or UV-stabilizers, colorants, or impact strength modifiers.

It is particularly advantageous to be able to control the hydrophilicity/hydrophobicity of thermoplastic copolyamides, especially for conversion in the form of textile yarns: better water absorption and thus better feel of the yarns (compared with that of cotton), more comfortable for the wearer, improvement in the fixing of dyes, etc.

The copolyamides that are more especially targeted by the invention are linear copolyamides of the type obtained from diacids and diamines, such as polyamide 6,6.

French patent application No. 2 793 252 describes hyperbranched copolyamides of the type with carboxylic acid end groups, obtained by the melt copolycondensation of 1,3,5-benzene tricarboxylic acid (BTC): core molecule of the type $R^1$—B"$_3$, with B"=COOH, 5-aminoisophthalic (AIPA): branching molecule of the type A-R—B$_2$, with A=NH$_2$ and B=COOH, and ε-caprolactam (CL: spacer of the type A'-R'—B' with A'=HN$_2$ and B'=COOH). These hyperbranched polyamides may be functionalized by incorporating into the melt copolycondensation a chain-terminating monomer of the type R'"-A. They are between a few nanometers and several tens of nanometers in size.

In this prior art, one of the essential objects of the present invention is to propose an additive for modifying the interaction, with respect to at least one agent, of a thermoplastic copolyamide matrix of the type such as the copolyamides obtained by polycondensation of diacids and diamines, the said additive needing to be:

incompatible with the matrix,
   capable of allowing the controlled modification of the interaction of the thermoplastic copolyamide, with respect to an internal or external chemical agent (for example water: hydrophilicity/hydrophobicity).

Another essential object of the invention is to provide a thermoplastic polymer composition comprising a thermoplastic polyamide matrix and at least one additive chosen from modifiers of the interaction of the thermoplastic copolyamide, with respect to an internal or external agent (for example water hydrophilicity/hydrophobicity), such that it can be readily and economically adapted to numerous applications, especially textile applications, while at the same time being able to be placed in melt form: injection-moulding, injection blow-moulding, extrusion blow-moulding, film formation, extrusion or spinning.

Another essential object of the invention is to provide articles obtained by conversion (moulding, injection-moulding, injection blow-moulding, extrusion blow-moulding, extrusion or spinning) of the composition as defined in the above objects.

These objects, inter alia, are achieved by the present invention, which is based on the fact that specific hyperbranched polymers functionalized with radicals that are incompatible with the matrix allow control of the interaction of copolyamides with a chemical or physical agent that is internal or external to the matrix, such as water.

Consequently, the present invention relates firstly to a thermoplastic composition comprising:

a thermoplastic copolyamide matrix of the type such as the copolyamides obtained by polycondensation of diacids and diamines;
   and at least one additive for modifying the interaction of the matrix, with respect to at least one agent, this additive consisting of at least one polymer:
   hyperbranched
   functionalized with $R^2$, via its end groups
   $R^2$ being a substituted or unsubstituted hydrocarbon-based radical, of the silicone, linear or branched alkyl, aromatic, arylalkyl, alkylaryl or cycloaliphatic type which may comprise one or more unsaturations and/or one or more hetero atoms, characterized in that the matrix and the functionalized hyperbranched polymer additive are incompatible.

The expression "hyperbranched polymer" means a branched polymer structure obtained by polymerization in the presence of compounds having a functionality of greater than 2, and the structure of which is not fully controlled. They are often random copolymers. Hyperbranched polymers may be obtained, for example, by reaction especially between multifunctional monomers, for example, trifunctional and bifunctional monomers, each of the monomers bearing at least two different polymerization-reactive functions.

Advantageously, the hyperbranched polymer of the invention is chosen from hyperbranched polyesters, polyesteramides and polyamides.

The hyperbranched polymer additive of the invention is preferably a hyperbranched polyamide of the type obtained by reaction between:

at least one monomer of formula (I) below:

A-R—B$_f$  (I)

in which A is a polymerization-reactive function of a first type, B is a polymerization-reactive function of a second type that is capable of reacting with A, R is a hydrocarbon-based species optionally comprising hetero atoms, and f is the total number of reactive functions B per monomer: $f \geq 2$, preferably $2 \leq f \leq 10$;

optionally at least one difunctional monomer of formula (II) below:

$$A'\text{-}R'\text{---}B' \quad (II)$$

or the corresponding lactams,
in which A', B' and R' have the same meaning as that given above for A, B and R, respectively in formula (I);
optionally at least one "core" monomer of formula (III)

$$R^1(B'')_n \quad (III)$$

in which:
$R^1$ is a substituted or unsubstituted hydrocarbon-based radical of the silicone, linear or branched alkyl, aromatic, alkylaryl, arylalkyl or cycloaliphatic type which may comprise unsaturations and/or hetero atoms;
B" is a reaction function of the same nature as B or B';
$n \geq 1$, preferably $1 \leq n \leq 100$; and
at least one "chain-limiting" functionalization monomer corresponding to formula (IV):

$$R^2\text{-}A'' \quad (IV)$$

in which:
A" is a reaction function of the same nature as A or A'.

Preferably, $R^2$ is not reactive with the matrix, such that the functionalized hyperbranched polymer does not affect the structural integrity of the matrix with which it is mixed. In particular, the functionalized hyperbranched polymer advantageously gives rise to only a small variation in the molar mass of the matrix, compared with a control composition comprising the same matrix to which hyperbranched polymer is not added. Any possible reduction in the molar mass of the matrix is preferably limited to less than 7% relative to the control composition.

According to the present invention, the molar mass is defined as the maximum of the molar mass distribution of the matrix, in polystyrene equivalents, by Gel Permeation Chromatography (GPC), with detection by refractometry. The molar mass measurement is performed on the composition to be analysed and on the control composition, which are extruded, solidified or placed in the form of granules, according to protocol P given in detail below.

In accordance with the invention, the functionalized hyperbranched polymer additive is incompatible with the matrix, such that the thermoplastic matrix (for example, PA 6,6) and the hyperbranched polymer, while being dispersible in each other, are subject to a demixing phenomenon, which nevertheless does not prevent regulation of the behaviour of the material with respect to an internal or external chemical or physical agent (for example water) by modifying qualitatively and quantitatively the incompatible functionalized HBPA incorporated.

The expression "incompatible functionalized hyperbranched polymer additive and matrix" means that the mixture of these two components of the composition form two separate phases.

A first method for characterizing the incompatibility of the hyperbranched polymer with respect to the matrix is the observation of the two phases by scanning electron microscopy or transmission electron microscopy and/or atomic force microscopy.

The composition according to the invention is advantageously characterized in that the two phases may be observed by transmission electron microscopy (with a magnification of greater than or equal to 2000, for example) optionally using a marker such as $OsO_4$ or $RuO_4$.

A second method for characterizing the incompatibility of the hyperbranched polymer with respect to the matrix concerns mechanical dynamic analysis or differential mechanical analysis or mechanical spectrometry, and more specifically the curve corresponding to the tangent $(\delta)=E''$ viscous modulus/$E'$ elastic modulus, as a function of the temperature. The maximum (or maxima) for this curve correspond(s) to the glass transition temperature(s) (Tg) of the test material.

Specifically, the miscibility between two polymers may be evaluated by studying their glass transition by means of a dynamic mechanical analysis technique,
if the polymers are compatible (miscible), only one glass transition will be observed, which is generally intermediate between that of the two components;
if the polymers are incompatible, two glass transitions very close to those of each of the components will be observed. If one of the components is present in small amount (less than 10%), it is possible that its glass transition will not be detected.

The composition according to the invention is advantageously characterized by a glass transition temperature, measured by mechanical dynamic analysis, which is substantially identical to that of the matrix, preferably identical to within 0.1° C.

The functionalized hyperbranched polymer additive is present in the composition of the invention especially in the form of nodules advantageously between 1 and 500 nm in size, for example from 100 to 200 nm in size. They may also be fibrils, cylinders, leaflets, etc.

These structural characteristics are entirely visible by transmission electron microscopy.

These nodules of incompatible functionalized hyperbranched polymer are dispersed in the copolyamide matrix and may even be repelled and concentrated at the surface of the article, for example a yarn, obtained from the composition comprising the matrix and the hyperbranched polymer.

To assess the effects of modifications induced by the incompatible functionalized hyperbranched polymer, in particular as regards the hydrophilicity/hydrophobicity of polyamide yarns, it is possible to use the capillary imbibition (capillary ascension) test: cf. examples.

The incompatible functionalized hyperbranched polymer additive is easy to use and economical.

Preferably, the hyperbranched copolymer constituting the functionalized hyperbranched polymer additive has a content of acid or amine end groups (EG)(expressed in meq/kg) of less than or equal to 50, preferably less than or equal to 20 and even more preferably less than or equal to 10.

Preferably, the composition according to the invention is free of hyperbranched polymer additives resulting in a decrease in the molar mass of the matrix M of greater than or equal to 7% relative to a control composition comprising the same matrix M to which no hyperbranched polymer is added, the molar mass measurement being performed according to a given protocol P. Protocol P for measuring the molar mass is given below.

According to the present invention, the molar mass is defined as the maximum of the molar mass distribution of the matrix, as polystyrene equivalents, by Gel Permeation Chromatography (GPC), with detection by refractometry, as is defined in protocol P given in the examples below.

The abovementioned protocol P for measuring the molar mass of the matrix M in a composition to be analysed and in a control composition involves an extrusion, which leads to the production of rods. The rods (placed beforehand in the form of granules) are then subjected to the actual molar mass determination.

As regards the composition M+ functionalized hyperbranched polymer of the invention, it may be noted that extrusion constitutes one of the means for melt-blending the constituents M and functionalized hyperbranched polymer.

The molar mass measurement is performed on the composition to be analysed and on the control composition, which are extruded, solidified and placed in the form of granules. The protocol P for measuring the molar mass of the compositions according to the invention and of the control compositions is as follows:

1. Matrix M/Functionalized Hyperbranched Polymer Compositions

The (co)polyamide matrix M and the functionalized hyperbranched polymer are in ground or crushed form as powder, flakes or granules, and are then preblended.

The blend is introduced into a twin-screw extruder.

This mixture is melted in the extruder at a temperature $Q \geq Q_{melting}$ of the matrix M+30° C.

Homogenization of M/hyperbranched polymer is thus performed for 5 minutes and rods are collected at the extruder outlet, and then placed in the form of granules.

The actual molar mass measurement is performed on the granules by gel permeation chromatography (GPC) in dicholoromethane after derivatization of the polyamide with trifluoroacetic anhydride, relative to polystyrene standards. The detection technique used is refractometry.

2/Control Compositions of Matrix M Without Hyperbranched Polymer Additive

For each given M/hyperbranched polymer composition, a molar mass measurement of the same matrix M is performed on a composition comprising the matrix M without hyperbranched polymer additive.

The method is performed on granules of copolyamide M obtained in the same way as that indicated in point 1 above, the only difference being that the granules do not contain any hyperbranched polymer additive.

According to one preferred arrangement of the invention, the functionalized hyperbranched polyamide additive of the composition is characterized in that:

the hydrocarbon-based species R and R' of the monomers (I) and (II) respectively, each comprise:
 i. at least one linear or branched aliphatic radical;
 ii. and/or at least one cycloaliphatic radical;
 iii. and/or at least one aromatic radical comprising one or more aromatic nuclei;
 iv. and/or at least one arylaliphatic radical;
 these radicals (i), (ii), (iii) and (iv) possibly being substituted and/or comprising hetero atoms;

A or A' is a reactive function of the amine or amine salt type or of the acid, ester, acid halide or amide type;

B or B' is a reactive function of the acid, ester, acid halide or amide type or of the amine or amine salt type.

Thus, the polymerization-reactive functions A, B, A' and B' that are more especially selected are those belonging to the group comprising carboxylic and amine functions.

For the purposes of the invention, the term "carboxylic function" means any acid function COOH or derivative of the ester, acid halide (chloride), anhydride or amide type.

Advantageously, the incompatible, functionalized hyperbranched polyamide may consist of a mixture of several different monomers (I), several different monomers (II) and/or several different functionalization monomers (IV).

The difunctional monomers (II) are spacer elements in the three-dimensional structure.

According to one advantageous embodiment of the invention, the functional spacer monomers (III), the chain-limiting monomers (IV) and/or the monomers (III) of "core" type may be in the form of prepolymers. Preferably, f=2, such that the monomer (I) is trifunctional: A-R—B$_2$, A=amine function, B=carboxylic function and R=aromatic radical.

Moreover, it is preferable for the functionalized hyperbranched polyamide additive to comprise monomers (III) in a III/I+II+IV molar ratio defined as follows:

$$III/I+II+IV \leq 1/150$$

and preferably $III/I+II+IV \leq 1/100$

In accordance with the invention, a first group of hyperbranched polyamide of large size may be isolated, in which:

$$1/50 \leq III/I+II+IV \leq 1/100$$

A preferred second group of hyperbranched polyamide of small size also exists, in which:

$$1/10 \leq III/I+II+IV \leq 1/40$$

In practice, and without it being limiting for the functionalized hyperbranched polyamide;

the monomer (I) is chosen from the group comprising:
 5-amino-isophthalic acid,
 6-amino-undecanedioic acid,
 3-aminopimelic diacid,
 aspartic acid,
 3,5-diaminobenzoic acid,
 3,4-diaminobenzoic acid,
 and mixtures thereof;

the difunctional monomer of formula (II) is chosen from the group comprising:
 ε-caprolactam and/or the corresponding amino acid; aminocaproic acid,
 para- or meta-aminobenzoic acid,
 11-amino-undecanoic acid,
 lauryllactam and/or the corresponding amino acid,
 12-aminododecanoic acid,
 and mixtures thereof;

the "core" monomer (III) is chosen from the group comprising:
 1,3,5-benzene tricarboxylic acid,
 2,2,6,6-tetra(β-carboxyethyl)cyclohexanone,
 2,4,6-triaminocaproic acid)-1,3,5-triazine
 4-aminoethyl-1,8-octanediamine,
 and mixtures thereof;

the "chain-limiting" functionalization monomer (IV) is chosen from the group comprising:
 n-hexadecylamine,
 n-octadecylamine,
 n-dodecylamine
 benzylamine,
 and mixtures thereof.

For further details regarding this hyperbranched polyamide, reference will be made to French patent application No. 2 793 252, both as regards the structural aspects and as regards the methods for obtaining this functionalized hyperbranched polyamide.

In a particular preferred manner, the alkyl functionalization radical R$^2$ of the hyperbranched polymer is chosen from:
 linear alkyls containing from 8 to 30 carbon atoms and preferably from 10 to 20 carbon atoms,
 polyetheralkylenes, preferably polyethylene and/or propylene glycol,
 organofluorines,
 silicones,
 and/or fatty chains.

As examples of functionalization monomers (IV), mention may be made of n-hexadecylamine or n-octadecylamine, or alternatively poly(oxyethylene-co-oxypropylene) (Jeffamine M1000®).

As regards the monomers (I), (II) and optionally (III), mention will be made, respectively, of AIPA, caprolactam CL and BTC.

| | |
|---|---|
| In quantitative terms, it has been possible to observe in the context of the invention, that the results are better when the additive comprising the hyperbranched and functionalized copolymer is present in a proportion (expressed as a % of "dry" weight relative to the total mass of the composition): | 0.01 to 50 |
| preferably | 0.1 to 20 |
| and even more preferably | 0.5 to 10. |

According to one particular embodiment of the invention, the functionalization radicals $R^2$ of the hyperbranched polymer are of the same type throughout the hyperbranched polymer. For example, the hyperbranched polymer may comprise radicals $R^2$ solely of alkyl type, rather than a mixture of several types of radical $R^2$.

The manufacture of a functionalized hyperbranched copolyamide of the type targeted above, namely:
consisting of one or more functionalized arborescent structures, via monomers (IV) bearing the functionality or functionalities under consideration, and
of the type such as the copolyamides obtained by reaction between:
at least one monomer of formula (I) below:

$$A\text{-}R\text{—}B_f \quad (I)$$

in which A is a polymerization-reactive function of a first type, B is a polymerization-reactive function of a second type capable of reacting with A, R is a hydrocarbon-based species optionally comprising hetero atoms, and f is the total number of reactive functions B per monomer: $f \geq 2$, preferably $2 \leq f \leq 10$;
optionally at least one difunctional monomer of formula (II) below:

$$A'\text{-}R'\text{—}B' \quad (II)$$

or the corresponding lactams,
in which A', B' and R' have the same meaning as those given above for A, B, and R,
respectively in formula (I):
optionally at least one "core" monomer of formula (III);

$$R^1(B'')_n \quad (III)$$

in which:
$R^1$ is a substituted or unsubstituted hydrocarbon-based radical, of the silicone, linear or branched alkyl, aromatic, alkylaryl, arylalkyl or cycloaliphatic type which may comprise unsaturations and/or hetero atoms;
B'' is a reactive function of the same nature as B or B';
$n \geq 1$, preferably $1 \leq n \leq 100$
and at least "chain-limiting" functionalization monomer corresponding to formula (IV):

$$R^2\text{-}A'' \quad (IV)$$

in which:
$R^2$ is a radical chosen from substituted or unsubstituted hydrocarbon-based radicals, of the silicone, linear or branched alkyl, aromatic, arylalkyl, alkylaryl or cycloaliphatic type which may comprise one or more unsaturations and/or one or more hetero atoms,
and A'' is a reactive function of the same nature of A or A', is performed by melt polycondensation between monomers (I), possibly monomers (II), which also react together and with monomers (IV), and possibly with monomers (III).

The polymerization by copolycondensation is carried out, for example, under conditions and according to a procedure that are equivalent to those used for the manufacture of linear polyamides, for example starting with monomers (II).

As regards the constituent that is essential in quantitative terms for the composition according to the invention, namely the thermoplastic copolyamide matrix, it is selected from the group comprising: nylon 6,6, nylon 9,9, polyamides 4-6, 6-10, 6-12, 6-36 and 12-12, and copolymers and blends thereof.

Examples of other polymers that may be mentioned include the polyphthalamides obtained from terephthalic acid and/or isophthalic acid, such as the polyamide sold under the trade name AMODEL, and the copolyamides obtained from adipic acid, hexamethylenediamine and caprolactam.

In accordance with one preferred embodiment of the invention, the thermoplastic (co)polymer(s) is (are) a polyamide 6,6.

According to another advantageous characteristic of the invention, the polymer matrix M of the composition consists of a blend and/or alloy of a polyamide with one or more other polymers, preferably polyamides or copolyamides.

A blend and/or alloy of (co)polyamide with at least one polymer of the polypropylene oxide (PPO), polyvinyl chloride (PVC), or polyacrylo-butadiene-styrene (ABS), may also be envisaged.

To improve the mechanical properties of the composition according to the invention, it may be advantageous to incorporate therein at least one reinforcing filler and/or bulking filler chosen from the group comprising fibrous fillers such as glass fibres, mineral fillers, such as clays, kaolin, reinforcing nanoparticles or particles made of thermosetting material, and powder fillers such as talc.

The degree of incorporation of reinforcing filler is in accordance with the standards in the field of composite materials. It may be, for example, a filler content of 1% to 90%, preferably from 10% to 60% and more specifically 50%.

The hyperbranched polymer additives may also be combined with other additives such as resilience modifiers, for instance optionally grafted elastomers.

Naturally, the composition according to the invention may also contain any other suitable additive or adjuvant, for example bulking fillers ($SiO_2$), flame retardants, UV stabilizers, heat stabilizers, matting agents ($TiO_2$), lubricants, plasticizers, compounds that are useful for catalysing the synthesis of polymer matrix, antioxidants, antistatic agents, pigments, colorants, moulding aids or surfactants. This list is not in any way limiting.

The compositions according to the invention may be used as raw materials in the field of technical plastics, for example for producing articles moulded by injection-moulding or by injection blow-moulding, extruded by standard extrusion or by blow-extrusion, or films.

The compositions according to the invention may also be made in the form of yarns, fibres or filaments by melt spinning.

As has already been mentioned above, the functionalized hyperbranched polymer additive is readily dispersible in the polyamide thermoplastic polymer matrix.

To do this, use may be made of any known methods for dispersing/blending particles in a resin.

A first method might consist in blending the functionalized hyperbranched polymer in the molten resin, and optionally in subjecting the blend to a high shear, for example in a twin-screw extrusion device, so as to produce a good dispersion. Such a device is generally arranged upstream of the means for forming the plastic melt (moulding, extrusion or spinning). According to one common embodiment, this blend is extruded in the form of rods that are then chopped into granules. The moulded parts are then produced by melting the granules produced above and feeding the composition in the melt into suitable moulding, injection, extrusion or spinning devices.

In the case of manufacturing yarns, fibres and filaments, the composition obtained at the extruder outlet optionally directly feeds a spinning plant.

A second method may be that which consists in blending the hyperbranched polymer with the monomers, in the polymerization medium of the thermoplastic matrix or during the polymerization.

According to one variant, a concentrated blend of a resin and of functionalized hyperbranched polymer, prepared, for example, according to one of the methods described previously, may be blended with the resin melt.

According to another of its aspects, the present invention is directed towards the articles obtained by forming, preferably by moulding, injection-moulding, injection blow-moulding, extrusion, extrusion blow-moulding or spinning, one of the polymer compositions to which hyperbranched polymer has been added and as defined above.

These articles may be yarns, fibres, films or filaments.

They may also be articles moulded using the composition according to the invention comprising polyamide, hyperbranched polymer as defined above, and optionally reinforcing fibres (glass).

The hyperbranched polymer additive modifies the interaction of the matrix of the article with respect to an agent, at the surface of the article and/or in the bulk (volume) of the article.

Advantageously, the agent whose interaction with the copolyamide matrix is modified by the functionalized hyperbranched polymer is water.

A subject of the invention is also the use as an additive for modifying the interaction, with respect to at least one agent, of a thermoplastic copolyamide matrix based:
- on at least one linear copolyamide of the type obtained from diacids and diamines; and
- on at least one functionalized hyperbranched polymer as defined above.

Other details and advantages of the invention will emerge more clearly in the light of the examples given below, purely for the purpose of illustration.

EXAMPLES

Figure 1:
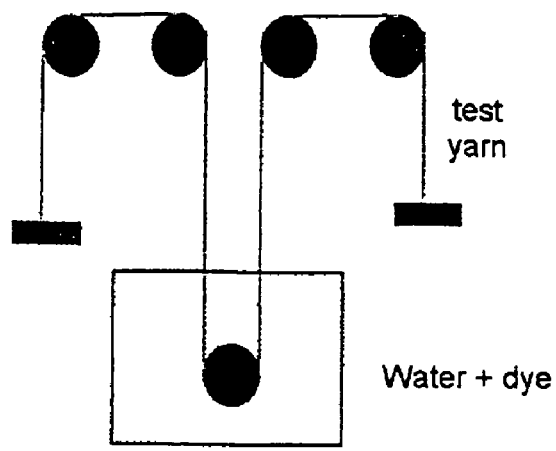
FIG. 1 is an assembly diagram for the inhibition test according to Example 7.

Example 1 synthesis of a hyperbranched copolyamide containing hexadecylamide end groups by melt copolycondensation of 1,3,5-benzene tricarboxylic acid (written BTC, core molecule of $R^1$—$B_3$, with B=COOH), of 5-aminoisophthalic acid (written AIPA, branching molecule of A-R—$B_2$, with A=$NH_2$), of ε-caprolactam (written CL, spacer of A-R'—B type) and of n-hexadecylamine (written $C_{16}$, alkyl blocker of $R^2$-A type). The respective overall composition is 1/5/10/8 of BTC/AIPA/CL/$C_{16}$.

The reaction is performed at atmospheric pressure in a 1.0 l autoclave commonly used in the laboratory for the melt synthesis of polyesters or polyamides.

The monomers are loaded completely at the start of the test into the reactor at 20° C. 190.4 g of solid 90% pure hexadecylamine (0.71 mol), 100.4 g of ε-caprolactam (0.89 mol), 80.4 g of 5-aminoisophthalic acid (0.44 mol), 18.6 g of 1,3,5-benzene tricarboxylic acid (0.09 mol) and 0.76 g of an aqueous 50% (w/w) hypophosphorous acid solution are successively introduced into the reactor. The reactor is purged by a succession of 3 sequences of placing under vacuum and re-establishing atmospheric pressure using dry nitrogen.

The reaction mass is gradually heated from 20 to 260° C. with stirring, over about 200 minutes.

After stirring for 63 minutes at 260° C., the reactor is gradually placed under vacuum over 61 minutes. The minimum vacuum achieved is 1 to 2 mbar, and is then maintained for a further 30 minutes. About 8 ml of distillate are collected.

At the end of the cycle, the stirring is stopped and the reactor is placed under an excess pressure of nitrogen. The base valve is gradually opened and the polymer is run out into a stainless-steel beaker. The product is then cooled in cardice under a stream of nitrogen. 339 g of polymer are collected, including the samples removed during synthesis.

The hyperbranched copolyamide obtained is vitreous.

Example 2 synthesis of a hyperbranched copolyamide containing octadecylamide end groups by melt copolycondensation of 1,3,5-benzene tricarboxylic acid (written BTC, core molecule of $R^1$—$B_3$ type, with B=COOH), of 5-aminoisophthalic acid (written AIPA, branching molecule of A-R—$B_2$ type with A=$NH_2$), of ε-caprolactam (written CL, spacer of A-R'—B type) and of n-octadecylamine (written $C_{18}$, alkyl blocker of $R^2$-A type). The respective overall composition is 1/6/6/9 of BTC/AIPA/CL/$C_{18}$, (III/I+II+IV=1/21).

The reaction is carried out at atmospheric pressure in a 0.5 l glass reactor commonly used in the laboratory of the melt synthesis of polyesters or polyamides.

122.0 g of 90% pure octadecylamine pellets (0.41 mol), 30.9 g of ε-caprolactam (0.27 mol), 49.4 g of 5-aminoisophthalic acid (0.27 mol), 9.6 g of 1,3,5-benzene tricarboxylic acid (0.05 mol) and 0.25 g of aqueous 50% (w/w) hypophosphorous acid solution are successively loaded into the reactor at 90° C.

The reaction mass is gradually heated from 90 to 260° C. with stirring, over about 200 minutes.

The temperature is maintained at 260° C. with stirring for 60 minutes. The reactor is then gradually placed under vacuum over 38 minutes. The minimum vacuum achieved is 5 mbar, and is then maintained for a further 65 minutes. 12.5 g of distillate are collected.

At the end of the cycle, the polymer is cooled in the reactor under a stream of nitrogen. 157.9 g of polymer are collected (not taking into account the samples taken during the process). The hyperbranched copolyamide is vitreous and may be readily crushed into flakes or ground.

Example 3 synthesis of a hyperbranched copolyamide containing hexadecylamide end groups, by melt copolycondensation of 1,3,5-benzene tricarboxylic acid (written BTC, core molecule of $R^1$—$B_3$ type, with B=COOH), of 5-aminoisophthalic acid (written AIPA, branching molecule of A-R—$B_2$ type, with A=$NH_2$), of ε-caprolactam (written CL, spacer of A-R'—B type), and of n-hexadecylamine (written $C_{16}$, alkyl blocker of $R^2$-A type). The respective overall composition is 1/25/25/28 of BTC/AIPA/CL/$C_{16}$.

The reaction is carried out at atmospheric pressure in a 1.0 l autoclave commonly used for the melt synthesis of polyesters or polyamides.

The monomers are loaded completely at the start of the test into the reactor at room temperature. 60.2 g of ε-caprolactam (0.532 mol), 96.4 g of 5-aminoisophthalic acid (0.532 mol), 4.5 g of 1,3,5-benzene tricarboxylic acid (0.021 mol), 160.0 g of 90% pure hexadecylamine (0.596 mol), and 0.380 g of aqueous 50% (w/w) hypophosphorous acid solution are successively introduced into the reactor. The reactor is purged by a succession of 3 sequences of placing under vacuum and re-establishing the atmospheric pressure with dry nitrogen.

The reaction mass is gradually heated to a temperature of 260° C. with stirring, over about 200 minutes.

After 40 minutes at 260° C. with stirring, the reactor is placed under gradual vacuum over 60 minutes. The minimum vacuum is then maintained for a further 30 minutes (less than 1 mbar). 13.5 g of distillate are recovered.

At the end of the cycle, the stirring is stopped and the reactor is placed under an excess pressure of nitrogen. The base valve is then gradually opened and the polymer is run out at 260° C. into a stainless-steel bucket. The product is then cooled in cardice under a stream of nitrogen. 265.0 g of polymer are collected.

The hyperbranched copolyamide obtained is vitreous and may be readily crushed into flakes or ground.

Example 4 synthesis of a hyperbranched copolyamide containing hexadecylamide end groups, by melt copolycondensation of 1,3,5-benzene tricarboxylic acid (written BTC, core molecule of $R^1$—$B_3$ type, with B=COOH), of 5-aminoisophthalic acid (written AIPA, branching molecule of A-R—$B_2$ type, with A=$NH_2$), of ε-caprolactam (written CL, spacer of A-R'—B type), and of n-hexadecylamine (written $C_{16}$, alkyl blocker of $R^2$-A type). The respective overall composition is 1/20/40/23 of BTC/AIPA/CL/$C_{16}$.

The reaction is carried out at atmospheric pressure in a 7.5 l autoclave commonly used for the melt synthesis of polyesters or polyamides.

The monomers are loaded completely at the start of the test into the reactor preheated to 70° C., and stirred at 80 rpm. 1408.9 g of 90% pure molten hexadecylamine (5.25 mol), 1033.5 g of ε-caprolactam (9.13 mol), 827.2 g of 5-aminoisophthalic acid (4.57 mol), 48 g of 1,3,5-benzene tricarboxylic acid (0.23 mol) and 6.5 g of aqueous 50% (w/w) hypophosphorous acid solution are successively introduced into the reactor.

The reaction mass is gradually heated from 70 to 260° C. with stirring over about 200 minutes.

After stirring for 30 minutes at 260° C., the reactor is gradually placed under vacuum over 60 minutes. The minimum vacuum is thus maintained for a further 30 minutes. 193.4 g of distillate are recovered.

At the end of the cycle, the polymer is run into a stainless-stain beaker and then cooled in cardice under a stream of nitrogen. 2837.5 g of polymer are collected.

The hyperbranched copolyamide obtained is vitreous.

Example 5 synthesis of a hyperbranched copolyamide containing poly(oxyethylene-co-oxypropylene) end groups, by melt copolycondensation of 5-aminoisophthalic acid (written AIPA, branching molecule of A-R—$B_2$ type, with A=$NH_2$ and B=$CO_2H$), of ε-caprolactam (written CL, spacer of A-R'—B type), and of Jeffamine M1000® (written PEG, poly(oxyethylene-co-oxypropylene) blocker of $R^2$-A type). The respective overall composition is 1/7/1 molar of AIPA/CL/PEG, equivalent to about 50/50, mass % of hyperbranched polyamide/Jeffamine®.

The reaction is carried out at atmospheric pressure in a 1 l autoclave commonly used for the melt synthesis of polyesters or polyamides.

283.0 g of ε-caprolactam (2.50 mol), 63.9 g of 5-aminoisophthalic acid (0.35 mol) and 300.0 μl of aqueous 50% (w/w) hypophosphorous acid solution are successively introduced into the reactor.

The reaction mass is gradually heated to a temperature of 220° C. with stirring, over about 200 minutes.

After stirring for 30 minutes at 220° C., 353.0 g of Jeffamine M1000® (0.35 mol) are introduced into the reaction mixture over a period of 20 minutes. Jeffamine M1000® is a monoamine poly(oxyethylene-co-oxypropylene) diblock, with respective DPs of 19 and 3, sold by Huntsman®.

The temperature of the reaction mass is then raised to 260° C. over 40 minutes, and then left at this temperature plateau for 1 hour.

The reactor is then placed under maximum vacuum, gradually over a period of 1 hour, and then maintained under these conditions for a further 30 minutes.

At the end of the cycle, the stirring is stopped and the reactor is then brought to atmospheric pressure under nitrogen, and then under an excess pressure of 5 bar. The base valve is gradually opened and the polymer is poured out at 260° C. into a conical flask. The product is then cooled in cardice under a stream of nitrogen. 635 g of polymer are collected.

The hyperbranched copolyamide obtained is in the form of a hard wax at room temperature. The differential thermal analysis shows 2 melting peaks, at 28 and 204° C. A glass transition is also observed at 155° C.

Example 6 preparation of samples of yarns of polyamide 6,6 supplemented with incompatible functionalized PAHBs according to Examples 1 to 4 and measurement of the molar masses of the matrix M of the functionalized M/PAHB compositions of Examples 1 and 2, measured on the yarns.

6.1/Preparation of the Yarn Samples

The polyamide 66 used is a Polyamide 66 comprising no titanium dioxide, with a relative viscosity of 2.5 (measured at a concentration of 10 g/l in 96% sulphuric acid).

The incorporation of the PAHB (2% and 5% by weight relative to the total weight of the composition) into the PA66 is performed by mixing powders and then melt-blending using a twin-screw extrusion device. The molten blend is then spun with a speed at the first point of call of 800 m/minutes, so as to obtain a continuous multifilament yarn of 90 dtex for 10 filaments.

The temperatures/pressure and spinning course and also the properties of the yarns obtained are detailed below:

Spinning temperature: 290° C.
Spinning course: no breaking
Pressure in the die: between 25 and 40 bar
Elongation at break: about 300%
Breaking stress: about 17 cN/tex.

The multifilament or yarn consists of 10 strands (the die consists of 10 holes) and the diameter of a strand is about 30 μm.

6.2/Measurement of the Molar Masses of the Matrix M of the Functionalized M/PAHB Compositions of Examples 1 and 2, Measured on the Yarns The results obtained are given in Table 1 below:

TABLE 1

| Composition | $M_{peak}$ in GPC detection by refractometry on yarn |
|---|---|
| PA 66 control | 66 000 |
| PA 66 + 5% 1/5/10/8 Example 1 | 67 000 |
| PA 66 + 5% 1/6/6/9 Example 2 | 66 000 |
| PA 66 + 2% 1/5/10/8 Example 1 | 66 000 |
| PA 66 + 2% 1/6/6/9 Example 2 | 66 000 |

Example 7 characterization of the behaviour with respect to water of the functionalized polyamide 6,6/HBPA yarns obtained in Example 6.

This characterization is performed by capillary imbibition of water into the multifilament consisting of 10 strands. Between the strands (typically 3 strands) a non-cylindrical capillary forms in which the water rises at a contact angle θ between the water and the strand. This angle θ is characteristic of the hydrophilicity/hydrophobicity of the surface of the yarn.

Principle of the Measure (Ref. A. Perwuelz, P. Mondon, C. Caze, Textile Res. J., 70(4), 333, 2000):

The principle of the measurement is as follows: the penetration of a liquid into a capillary network is governed by a competition between the capillary forces and the force of gravity. The capillary network here is formed between the strands of the multifilament; it is not a cylindrical model network, but it may be modelled as an assembly of cylindrical capillaries having an equivalent radius R.

Now, in the case of capillary ascension in a cylindrical model capillary, there is a physical law that links the height of ascension to the ascension time. In the first moments of the imbibition kinetics, the contribution made by gravity may be ignored, and Washburn's law applies:

$$h^2 = (R\gamma \cos\theta / 2\eta)t$$

with: h: height of the ascension front of the liquid (m)
t: time(s)
R: radius of the capillary (m)
η: viscosity of the liquid (Pa·s)
γ: surface tension of the liquid (N/m)
θ: contact angle between the liquid and the solid.

After having verified that this law applies to the imbibition of the test filaments, it will be possible to compare them using the same liquid, water, for the imbibition. This will then give γ and η equal for each sample and also R by construction of the multifilaments. It will thus be possible to compare the cos θ and thus the hydrophilicity/hydrophobicity of the various multifilaments using the following formula:

$$h^2 = (A \cos\theta)t$$

with A: constant.

Equipment and Method

The multifilaments studied all consist of 10 strands of about 30 μm. They are non-sized so as to be able genuinely to study their surface properties. The yarns were conditioned for at least 48 hours before the start of the experiments at a controlled temperature and hygrometry (22° C. and 50 RH).

Figures 2A, 2B:
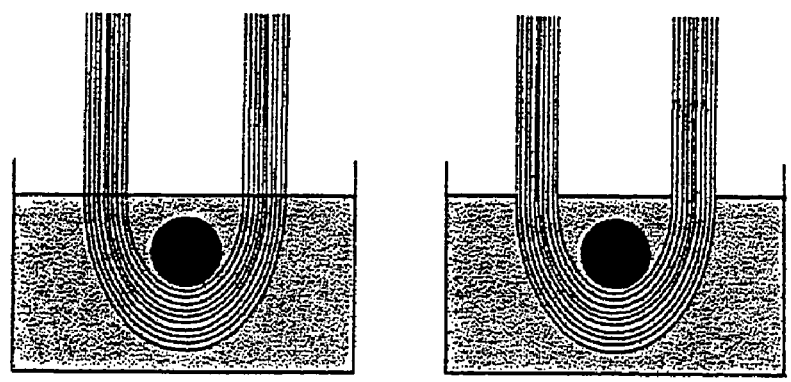
FIG. 2a is a diagram representing at time t=0 the yarn formed by a multifilament in the inhibition test according to Example 7.
FIG. 2b is identical to FIG. 2a at a time t>0.

The assembly used to visualize the imbibition and shown in the attached FIG. 1 is as follows: the test yarn formed by multifilament is placed under tension using a system of pulleys and of two masses of 20 g attached to each end of the yarn. The yarn is dipped in a solution of coloured water so as to visualize the imbibition. The dye chosen, which does not interact with the polyamide, is methylene blue at a concentration of 0.2%. The capillary ascension is filmed by a camera connected to a video recorder and to a screen with a timer. The zero point of the experiment corresponds to the moment at which the yarn is dipped in the coloured solution (FIGS. 2a and 2b).

Results and Discussion

For all the test yarns, it was confirmed that the imbibition kinetics obey Washburn's law in the first two minutes of the capillary ascension. The coefficient of regression obtained for the straight line $h^2 = f(t)$ is always greater than 0.99. Consequently, the various multifilaments tested may all be modelled by an assembly of capillaries of the same radius R. To compare them, it then suffices to compare the slopes of the straight line $h^2 = f(t)$. The results obtained for control yarns or supplemented yarns, averaged over 7 experiments, are given in Tables 2 to 8 below.

TABLE 2

| Sample | Slopes (mm²/s) | Average slope and standard deviation (mm²/s) |
|---|---|---|
| Control PA 66 | 11.9 | |
| | 4.6 | |
| | 6.7 | |

TABLE 2-continued

| Sample | Slopes (mm$^2$/s) | Average slope and standard deviation (mm$^2$/s) |
|---|---|---|
| | 6.7 | 8.3 ± 2.5 |
| | 9.4 | |
| | 10.6 | |
| | 6.4 | |
| | 10.1 | |

TABLE 3

| Sample | Slopes (mm$^2$/s) | Average slope and standard deviation (mm$^2$/s) |
|---|---|---|
| PA66 + 2% HBPA Example 1 | 0.5 | |
| | 0.5 | |
| | 0.4 | |
| | 0.3 | 0.4 ± 0.1 |
| | 0.3 | |
| | 0.4 | |
| | 0.6 | |
| | 0.4 | |

TABLE 4

| Sample | Slopes (mm$^2$/s) | Average slope and standard deviation (mm$^2$/s) |
|---|---|---|
| PA66 + 5% HBPA Example 1 | 0.3 | |
| | 0.3 | |
| | 0.4 | |
| | 0.3 | 0.3 ± 0.1 |
| | 0.3 | |
| | 0.3 | |
| | 0.4 | |
| | 0.4 | |

TABLE 5

| Sample | Slopes (mm$^2$/s) | Average slope and standard deviation (mm$^2$/s) |
|---|---|---|
| PA66 + 2% HBPA Example 2 | 0.2 | |
| | 0.6 | |
| | 0.8 | |
| | 0.5 | 0.5 ± 0.2 |
| | 0.4 | |
| | 0.3 | |
| | 0.5 | |
| | 0.4 | |

TABLE 6

| Sample | Slopes (mm$^2$/s) | Average slope and standard deviation (mm$^2$/s) |
|---|---|---|
| PA66 + 5% HBPA Example 2 | 0.5 | |
| | 0.3 | |
| | 0.3 | |
| | 0.3 | 0.3 ± 0.1 |
| | 0.2 | |
| | 0.1 | |
| | 0.2 | |
| | 0.3 | |

TABLE 7

| Sample | Slopes (mm$^2$/s) | Average slope and standard deviation (mm$^2$/s) |
|---|---|---|
| PA66 + 5% HBPA Example 3 | 3.2 | |
| | 2.5 | |
| | 3.1 | |
| | 1.5 | 2.3 ± 0.6 |
| | 2.1 | |
| | 1.5 | |
| | 2.3 | |
| | 2.4 | |

TABLE 8

| Sample | Slopes (mm$^2$/s) | Average slope and standard deviation (mm$^2$/s) |
|---|---|---|
| PA66 + 5% HBPA Example 4 | 4 | |
| | 5.8 | |
| | 3.3 | |
| | 1.5 | 4.8 ± 2.2 |
| | 3 | |
| | 6.7 | |
| | 6.4 | |
| | 7.9 | |

It is seen that, for the yarns containing functionalized PAHBs, the slope of the straight line $h^2=f(t)$ is markedly lower, which implies a smaller cos θ, i.e. a larger wetting angle θ. The yarns containing functionalized HBPAs are more hydrophobic at the surface than the control PA66 yarn.

Example 8

Preparation of samples of hydrophilic yarns of polyamide 6,6 supplemented with incompatible functionalized PAHBs according to Example 5.

Materials Used:
Polyamide 66 comprising 0.3% by weight of titanium dioxide, with relative viscosity of 41 (measured at 8.4% of polymer in 90% formic acid)
Hydrophilic PAHB of Example 5.

Granules are prepared comprising the polyamide and one of the additives by extrusion in a twin-screw extruder with a feed of granules of each of the constituents. The compositions thus prepared are given in Table 9.

TABLE 9

| | Example 8.1 comparative | Example 8.2 |
|---|---|---|
| Polyamide (% by weight) | 100% | 90% |
| Hydrophilic HBPA of Example 5 (% by weight) | 0% | 10% |

Yarns are melt-spun from the granules prepared at a temperature of 285° C. The yarn is wound at a speed of 4200 m/minute and at a yarn count of 45 dtex per 10 filaments. The filaments obtained from several reels are woven so as to form socks 5 cm in diameter.

The water uptake of the compositions is measured by the change in weight after a residence time of 48 hours in a conditioned chamber at a relative humidity of 94% at 30° C.

or 54% at 30° C., followed by treatment for 16 hours in an oven set at 80° C. under a pressure of 7 mm of mercury. The water uptake is calculated as follows:

Water uptake (%)=[(wet mass−dry mass)/dry mass]* 100, the results are given in Table 10.

The wet mass is the mass measured before the residence time in the chamber and treatment in the oven. The dry mass is the mass measured after the residence in the chamber and treatment in the oven.

TABLE 10

|  | Examples | |
| --- | --- | --- |
|  | 8.1 comparative | 8.2 |
| 94% water uptake | 6.4% | 7.2% |
| 54% water uptake | 2.5% | 2.7% |

Example 9

Observation by transmission electron microscope (magnification ×5000) of a yarn consisting of the material made by extrusion as described in Example 6, using PA66 containing 5% by weight of the PAHB according to Example 1.

Figure 3:
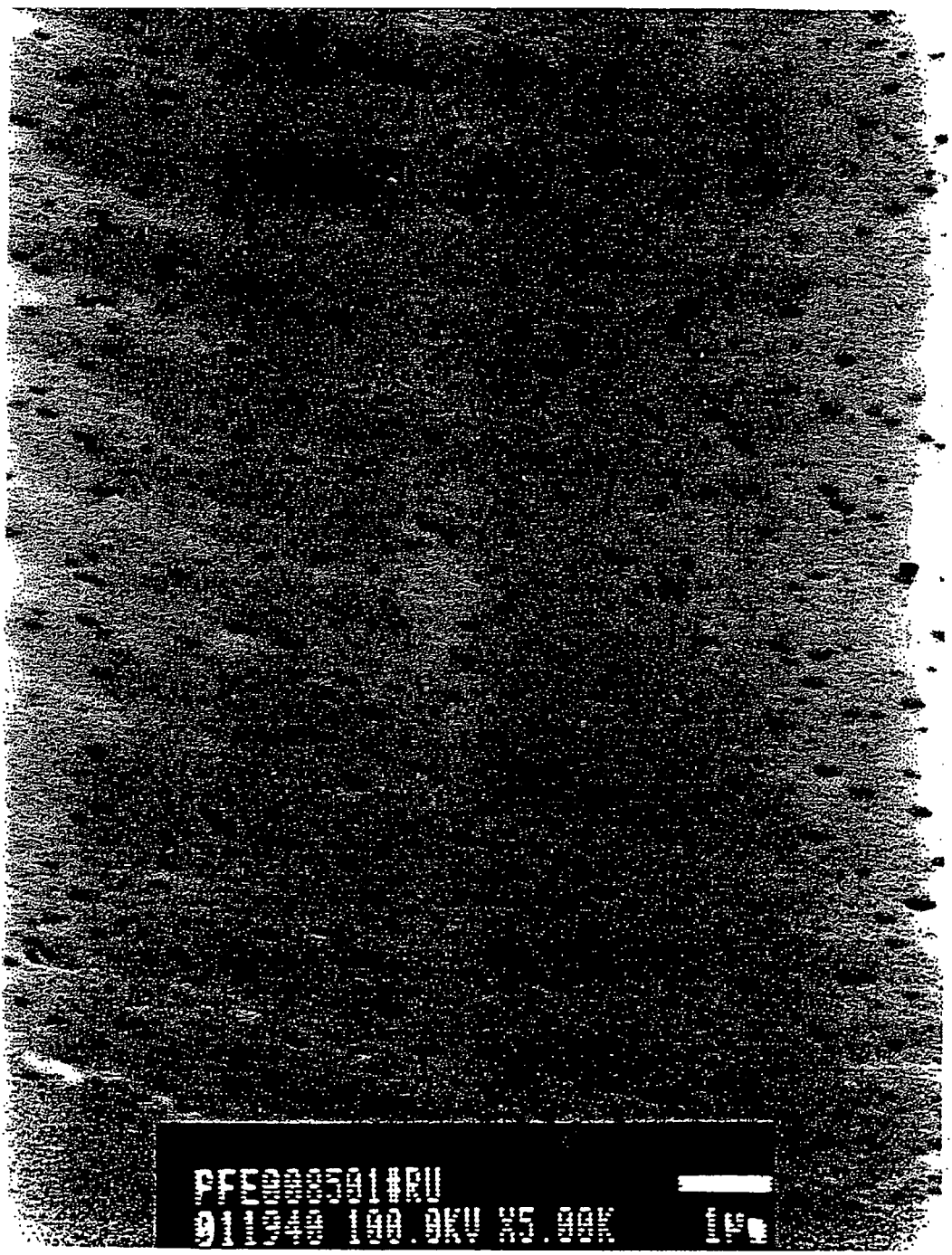
FIG. 3 is an observation photograph of a view by transmission electron microscope (magnification ×5000) of a yarn consisting of a material made by extrusion as described in Example 6, using. PA66 having a content of 5% by weight of PAHB according to Example 1.

FIG. 3 shows the result of the observation. It emerges from this FIG. 3 that the functionalized PAHB additive is in the form of differentiated nodules with an average size of less than 1 µm, dispersed in a continuous phase formed by the PA66. The functionalized PAHB additive+PA66 matrix blend constitute two phases that may be observed by transmission electron microscopy at high magnification. The functionalized PAHB additive and the matrix are therefore incompatible (immiscible).

Example 10

ADDITIVE/MATRIX COMPATIBILITY (MISCIBILITY) (Ref. I. M. Ward, D. W. Hadley, "An introduction to the mechanical properties of solid polymers", Chapter 9, John Wiley & Sons, 1993).

In the case of the multifilaments produced, whether this is a control PA66, or a PA66 supplemented with PAHBs of Examples 1 to 4, the measurement of the glass transition on dried multifilaments always leads to a value of 77.2° C., which proves the incompatible (immiscible) nature of the PA66/PAHB blends of Examples 1 to 4.

The invention claimed is:

1. A thermoplastic composition comprising:
a thermoplastic polyamide or copolyamide matrix based on polyamides or copolyamides obtained by polycondensation of diacids and diamines; and
at least one additive for modifying the interaction of the matrix with respect to at least one agent, this additive comprising at least one polymer that is hyperbranched, and functionalized with $R_2$, via its end groups,
$R^2$ being a substituted or unsubstituted hydrocarbon-based radical selected from the group consisting of a silicone radical, a linear or branched alkyl radical, an aromatic radical, an arylalkyl radical, an alkylaryl radical and a cycloaliphatic radical, the hydrocarbon-based radical optionally having one or more unsaturations or one or more hetero atoms,
said matrix and the functionalized hyperbranched polymer additive being incompatible.

2. The composition according to claim 1, wherein the hyperbranched polymer is a polyester, polyesteramide or a polyamide.

3. The composition according to claim 1, wherein the hyperbranched polymer additive is a hyperbranched polyamide obtained by reaction between:
at least one monomer of formula (I) below:

$$A\text{-}R\text{—}B_f \quad (I)$$

wherein A is a polymerization-reactive function of a first type, B is a polymerization-reactive function of a second type that is capable of reacting with A, R is a hydrocarbon-based species optionally comprising hetero atoms, and f is the total number of reactive functions B per monomer with $f \leq 2$;

optionally at least one difunctional monomer of formula (II) below:

$$A'\text{-}R'\text{—}B' \quad (II)$$

or the corresponding lactams,
wherein A', B' and R' have the same meaning as that given above for A, B and R, respectively in formula (I);
optionally at least one "core" monomer of formula (III)

$$R^1(B'')_n \quad (III)$$

wherein:
$R^1$ is a substituted or unsubstituted hydrocarbon-based radical selected from the group consisting of a silicone radical, a linear or branched alkyl radical, an aromatic radical, an alkylaryl radical, an arylalkyl radical and a cycloaliphatic radical, the hydrocarbon-based radical optionally having one or more unsaturations or one or more hetero atoms;
B" is a reaction function of the same nature as B or B';
$n \geq 1$; and
at least one "chain-limiting" functionalization monomer corresponding to formula (IV):

$$R^2\text{-}A''(IV)$$

wherein:
A" is a reaction function of the same nature as A or A'.

4. The composition according to claim 3, wherein $$2 \leq f \leq 10, \text{ and } 1 \leq n \leq 100.$$

5. The composition according to claim 3, wherein the hyperbranched polymer has a content of acid or amine end groups (GT) (expressed in meq/kg) of less than or equal to 50.

6. The composition according to claim 3, wherein, in the hyperbranched polymer constituting the additive:
the hydrocarbon-based species R and R' of the monomers (I) and (II) respectively, each comprise:
i. at least one linear or branched aliphatic radical;
ii. at least one cycloaliphatic radical;
iii. at least one aromatic radical comprising one or more aromatic nuclei; or
iv. at least one arylaliphatic radical;
these radicals (i), (ii), (iii) and (iv) optionally being substituted or having hetero atoms;
A or A' is a reactive function which is amine, amine salt, acid, ester, acid halide or amide;
B or B' is a reactive function which is acid, ester, acid halide, amide, amine, or amine salt.

7. The composition according to claim 6, wherein the polymerization, reactive functions A, B, A' and B' of the hyperbranched polymer are carboxylic or amine functions.

8. The composition according to claim 3, wherein the hyperbranched polymer has monomers (III) in a III/I+II+IV ratio defined as follows:

III/I+II+IV≦1/150.

9. The composition according to claim 8, wherein

1/50≦III/I+II+IV≦1/100.

10. The composition according to claim 8, wherein

1/10≦III/I+II+IV≦1/40.

11. The composition according to claim 3, wherein the monomer of formula (I) of the hyperbranched copolyamide is a compound wherein A represents the amine function, B represents the carboxylic function, R represents an aromatic radical and f=2.

12. The composition according to claim 3, wherein the monomer (I) is:
- 5-amino-isophthalic acid,
- 6-amino-undecanedioic acid,
- 3-aminopimelic diacid,
- aspartic acid,
- 3,5-diaminobenzoic acid, or
- 3,4-diaminobenzoic acid;

the difunctional monomer of formula (II) is:
- ε-caprolactam or the corresponding amino acid,
- aminocaproic acid,
- para- or meta-aminobenzoic acid,
- 11-amino-undecanoic acid,
- lauryllactam or the corresponding amino acid, or
- 12-aminododecanoic acid;

the "core" monomer (III) is:
- 1,3,5-benzene tricarboxylic acid,
- 2,2,6,6-tetra(β-carboxyethyl)cyclohexanone,
- 2,4,6-(triaminocaproic acid)-1,3,5-triazine, or
- 4-aminoethyl-1,8-octanediamine; and the "chain-limiting" functionalization monomer (IV) is:
- n-hexadecylamine,
- n-octadecylamine,
- n-dodecylamine, or
- benzylamine.

13. The composition according to claim 1, wherein $R^2$ is not reactive with the matrix.

14. The composition according to claim 1, further forming two phases observed by transmission electron microscopy, optionally with a magnification of greater than or equal to 2000.

15. The composition according to claim 1, having a glass transition temperature (Tg), measured by mechanical dynamic analysis, which is substantially identical to that of the matrix.

16. The composition according to claim 1, wherein the thermoplastic polyamide(s) or copolyamide(s) constituting the matrix is (are): nylon 6,6, nylon 9,9, polyamides 4-6, 6-10, 6-12, 6-36, or 12-12, or copolymers thereof.

17. The composition according to claim 16, wherein the thermoplastic polyamide(s) or copolyamide(s) is (are) a polyamide (or polyamides) 6,6.

18. The composition according to claim 1, wherein the additive comprising the hyperbranched and functionalized polymer is present in a proportion (expressed as a % of dry weight relative to the total mass of the composition) of 0.01 to 50.

19. The composition according to claim 1, wherein the radicals $R_2$ are the same throughout the hyperbranched polymer.

20. The composition according to claim 1, further comprising at least one reinforcing filler.

21. The composition according to claim 1, wherein the agent is water.

22. Articles obtained by forming a composition as defined in claim 1.

23. Articles according to claim 22, being yarns, fibers, films or filaments.

* * * * *